Figure 2C:
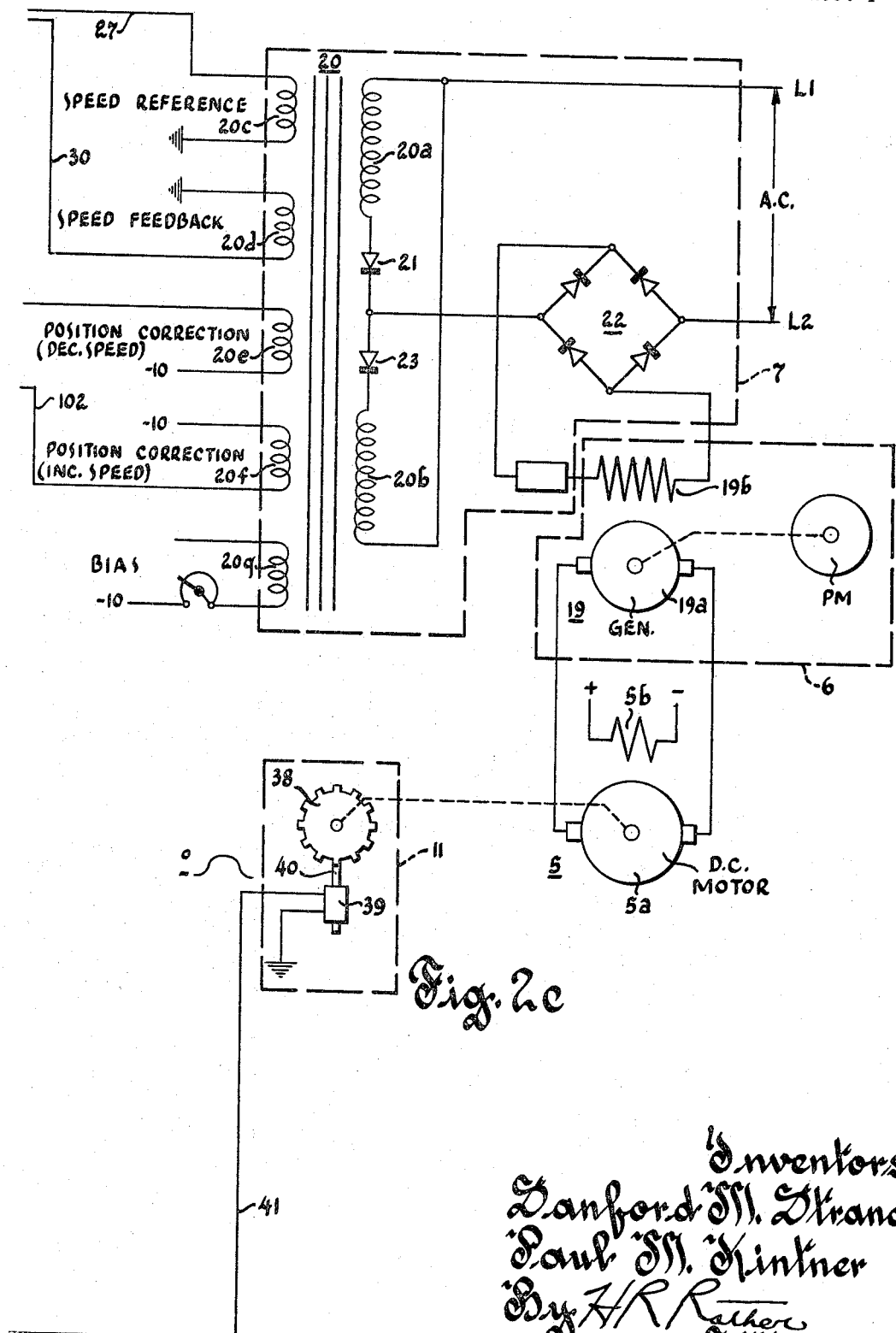

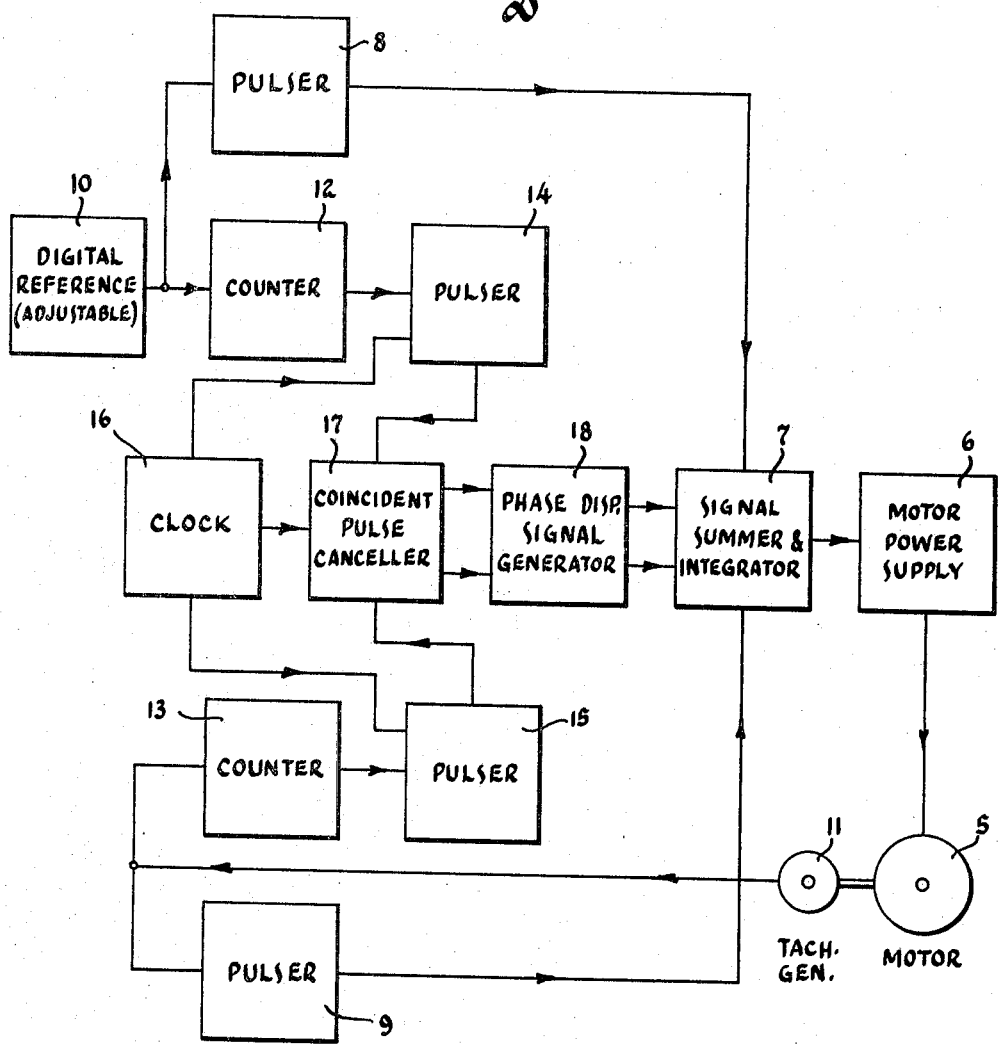

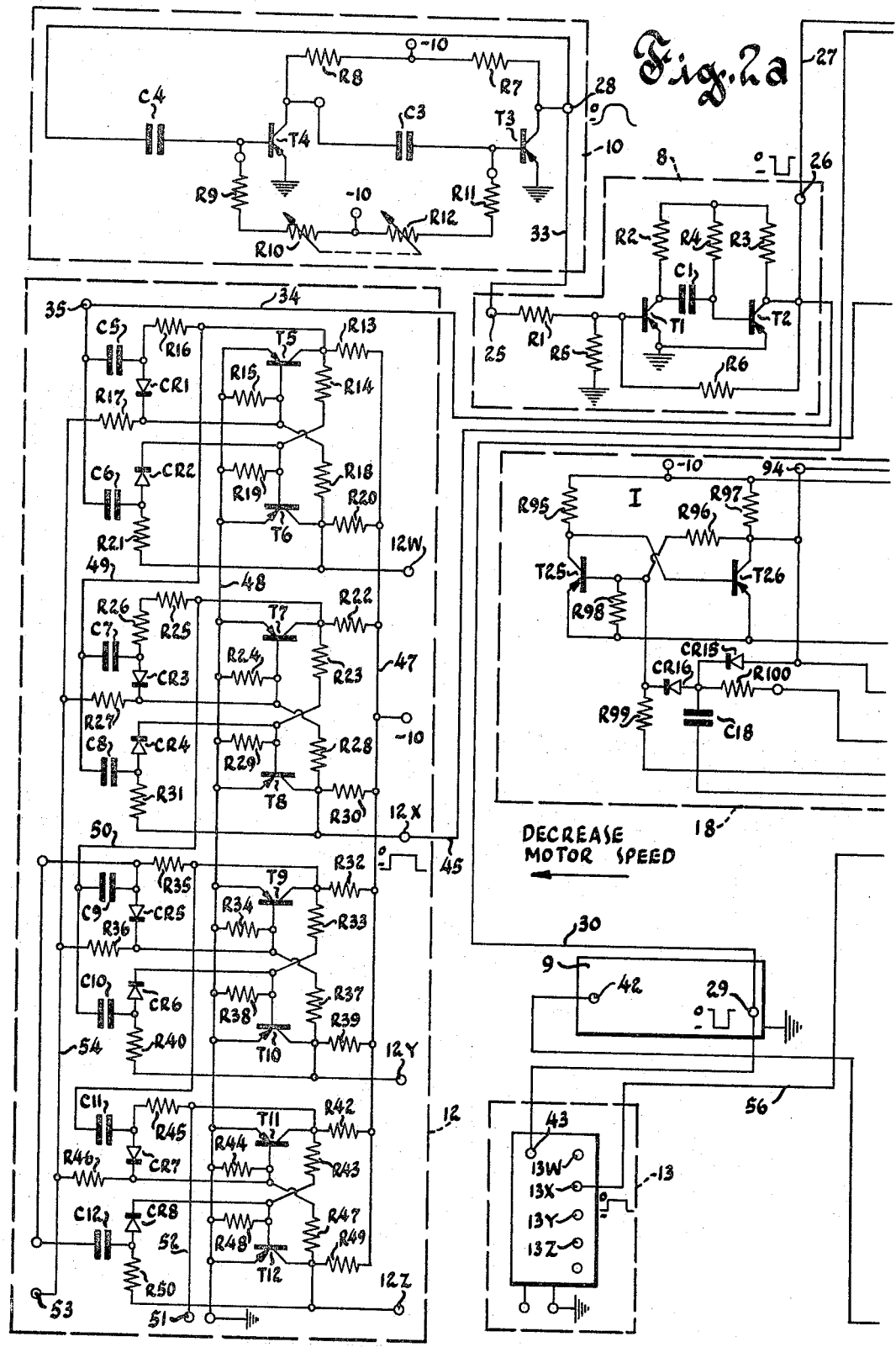

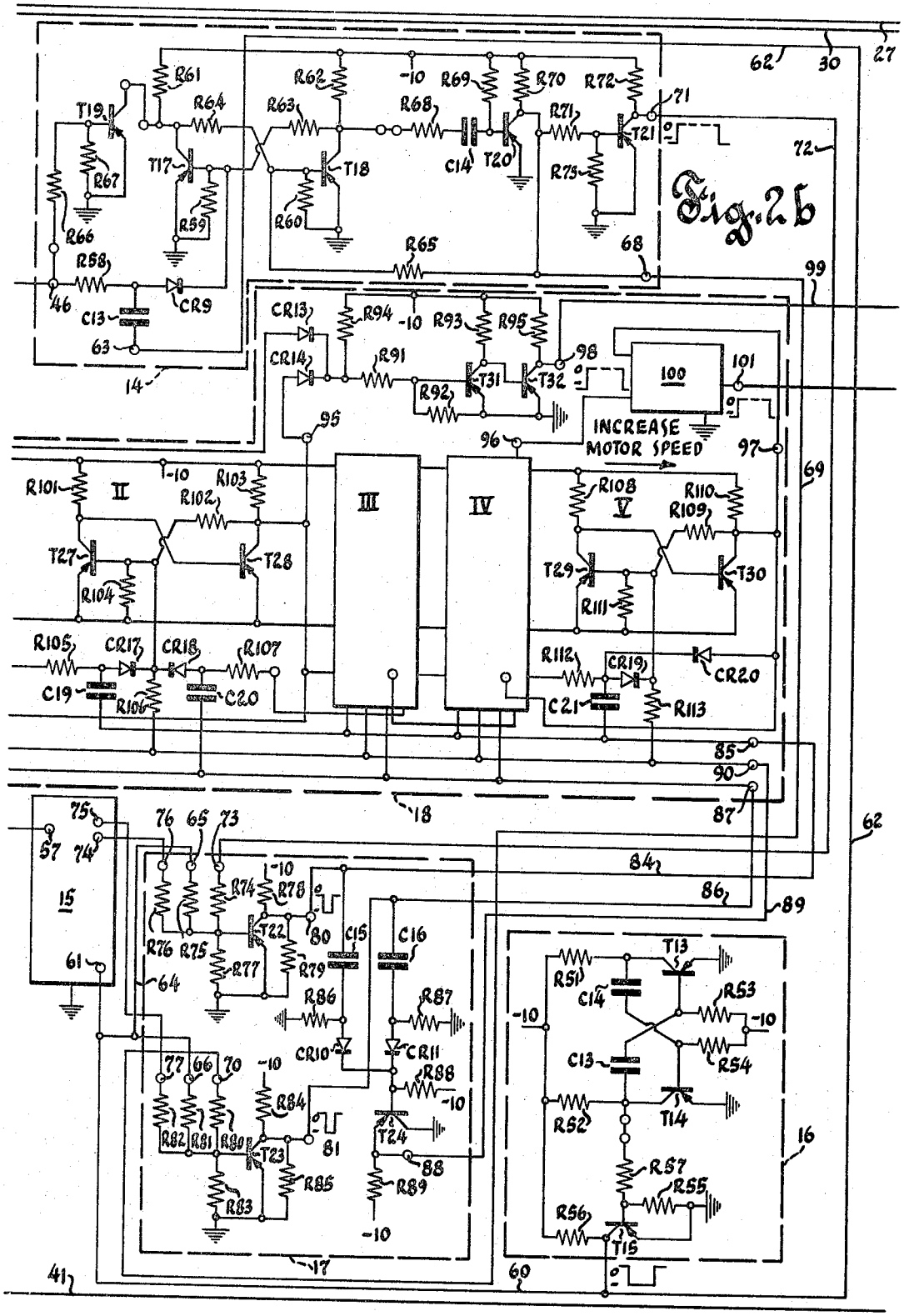

Fig. 3a

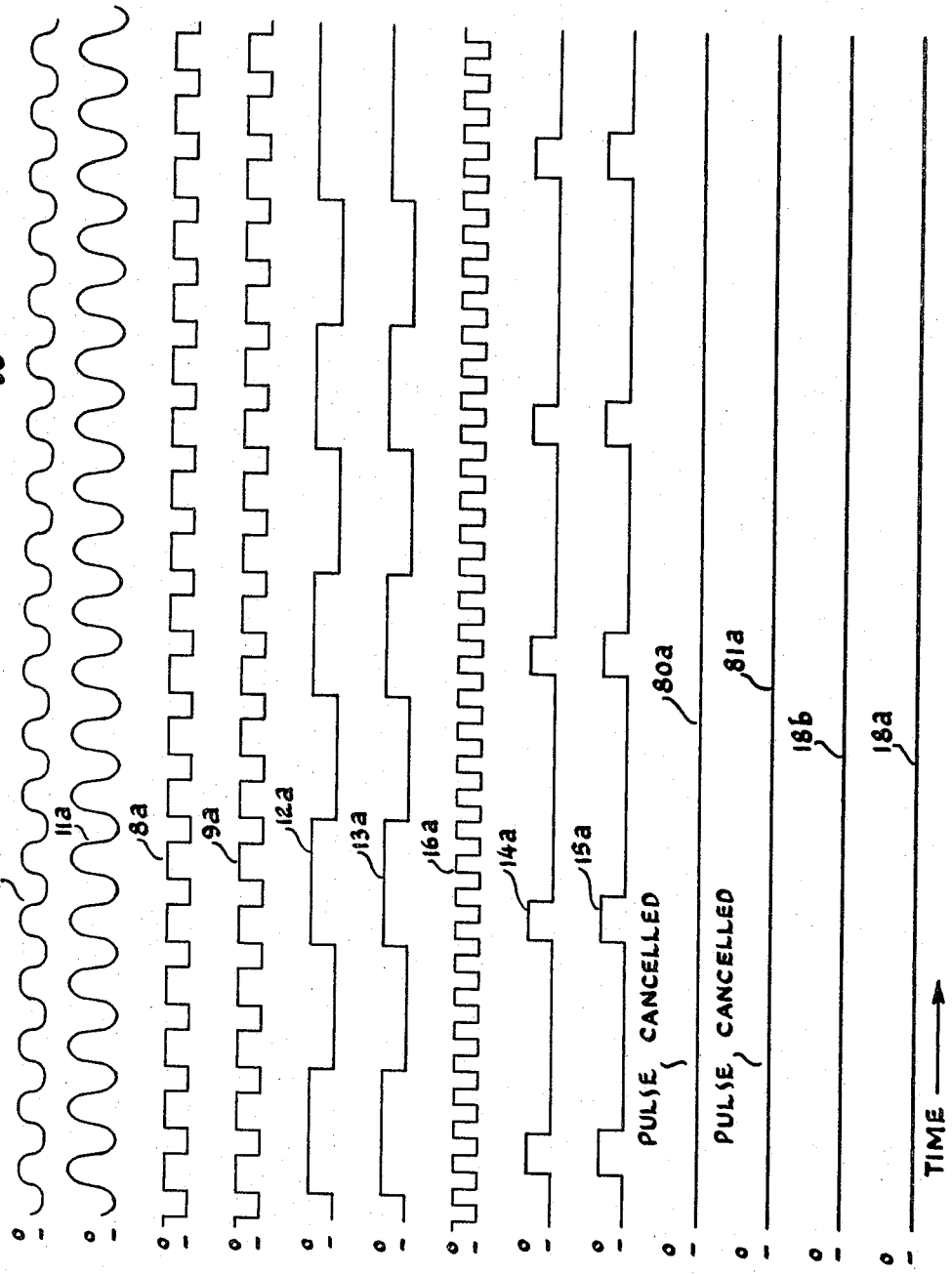

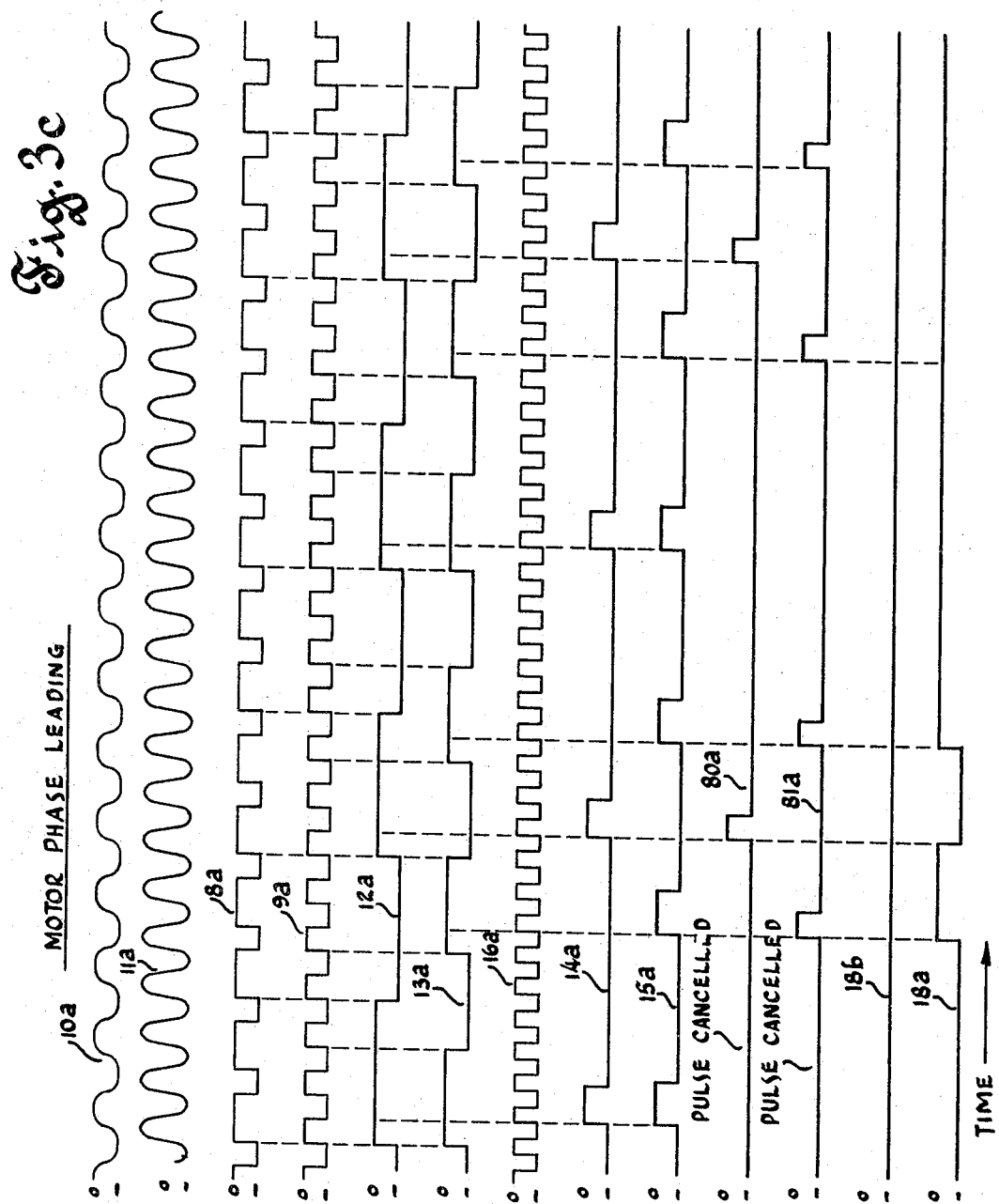

United States Patent Office 3,331,006
Patented July 11, 1967

3,331,006
DIGITAL SPEED AND POSITION REGULATING MOTOR CONTROL SYSTEM
Sanford M. Strand, Milwaukee, Wis., and Paul M. Kintner, Huntington Station, N.Y., assignors to Cutler-Hammer, Inc., Milwaukee, Wis., a corporation of Delaware
Filed Mar. 13, 1964, Ser. No. 351,743
9 Claims. (Cl. 318—314)

This invention relates to a speed and position regulating electric motor control system.

More particularly it relates to a motor control system wherein the speed and angular position of the shaft of a controlled motor is maintained within predetermined speed and phase deviation limits relative to a reference speed and position device.

The development of digital techniques in the control of electric motors makes possible relatively precise speed-position control. Digital type position regulating control systems heretofore used have counted the difference in pulses, produced by a speed reference generator and pulses produced by a pulse generator driven by the controlled motor and supplied these to a forward-backward counter. With means provided to cancel coincident pulses from the two sources the difference in counts for a given interval of time represents the position error between the reference and the motor. In order to convert this digital error signal to a useful analog regulating signal a digital-to-analog convertor must be employed to provide an analog voltage or current which is proportional to the digital value.

It is a primary object of the present invention to provide an improved form of digital type speed regulation, where the position regulating portion of the system consists of two infinitely variable volt-second signals of constant amplitude and infinitely variable width, one for positive and on for negative position correction.

Another object is to provide a control system of the aforementioned type wherein analog voltages or signals proportional to the position or phase displacement are developed by employment of simple one-way digital counters and a novel but relatively simple form of reversible shift register.

A further object is to provide a control system of the aforementioned type wherein the deviation limit to which the system regulates can be readily changed by changes in count required to provide an output from the one-way counters.

A still further object is to provide a position regulating system wherein lost or gained revolution or parts thereof in excess of a given multiple of the preset deviation limit are disregarded and the system regulates to bring back correspondence within the deviation limit at the next revolution or portion thereof in which there is phase correspondence between the reference speed pulse generator and the motor driven pulse generator.

Another object is to provide a complete speed regulator system with both velocity and position regulation signals being provided by a single set of digital reference and speed feedback generators.

Still another object is to provide a position regulating system which can be superimposed on, and be optionally used with known forms of digital type speed regulating systems; and Other objects and advantages of the invention will hereinafter appear.

The accompanying drawings illustrate a preferred embodiment of the invention which will now be described, it being understood that the embodiment is susceptible of various modifications without departing from the scope of the appended claims.

In the drawings:

FIGURE 1 is a schematic showing of a motor and control system incorporating the invention;

FIGS. 2a, 2b and 2c diagrammatically depict the details of the complete control system; and FIGS. 3a, 3b and 3c are graphical representations of output voltages at different points in the control system under three different motor operating conditions.

In FIG. 1 a motor and control system therefore is shown in block diagram form to facilitate a basic over-all understanding of its organization and operation which will now be described. Motor 5 is a DC motor which may be connected to a drive a suitable load (not shown). A power supply 6 in turn may be assumed to supply motor 5 with armature voltage which is regulatable in magnitude. Power supply 6 in turn is controlled by an analog control voltage derived from a signal summer-integrator network 7.

The summer-integrator 7 is supplied with input pulses of a predetermined amplitude and time period width, but varying in frequency, from pulsers 8 and 9. The output frequency of pulses from pulser 8 is determined by input pulses supplied to it from a reference pulse generator 10, which may be assumed to supply pulses at a constant but adjustable frequency rate. The frequency of the pulse output of pulser 9 is determined by the rate of input pulses to the latter supplied by a digital tachometer generator 11 which is driven by the shaft of motor 5.

As so far described, the control system will function to provide speed regulation of motor 5. With reference pulse generator 10 set to provide output pulses at a frequency corresponding to a desired motor speed, pulser 8 will in turn supply pulses to summer-integrator 7 at a corresponding rate. Summer-integrator 7 will then provide an output control voltage of a magnitude which will accelerate motor 5. As motor 5 accelerates from rest, tachometer generator 11 generates pulses at a frequency which at any instant is indicative of the error of the speed of the motor in respect to the desired speed as dictated by the frequency of pulses from reference generator 10. Thus pulser 9 will correspondingly supply input pulses at a frequency that increases with motor speed. This causes summer-integrator 7 to gradually decrease the magnitude of its output control voltage to power supply 6. When the motor approaches the desired speed the magnitude of such output control voltage will be at a value which will cause motor 5 to run under steady state conditions at the desired speed.

Incipient changes in load following attainment of the desired steady state speed, of course, will cause the system to regulate the motor power supply to a value to counteract such changes and maintain the motor speed at the desired value. As aforementioned, the position regulating input voltage to the power supply is an analog voltage.

We also provide an improved form of motor position control which is superimposed on the aforementioned speed regulating control. This comprises counters 12 and 13, pulser-drivers 14 and 15, a synchronous clock 16, a coincident pulse canceller 17 and a phase displacement signal generator 18. Counter 12 is supplied with input pulses from reference pulse generator 10 and provides constant amplitude output pulses having a duration width in accordance with the time required to register a given count of input pulses. Similarly, counter 13 is supplied with input pulses from digital tachometer generator 11 and provides output pulses of a constant amplitude of a duration width in accordance with the time required to register the same given count of input pulses.

With motor 5 running at a different speed than that dictated by the digital reference generator, the duration width of the pulses at the output of counter 13 will be less or greater than the width of the output pulses from counter 12. Moreover, the time phase difference between such sets of output pulses will be in accordance with difference of the angular position lead or lag between motor 5 and its reference speed device. If digital reference generator 10 were replaced by a digital tachometer, like generator 11, driven by a lead motor with which it is desired to have the speed and position of motor 5 run in synchronism, then the last mentioned time phase lead or lag between output pulses of counters 12 and 13 would indicate the angular position lead or lag of the shaft of motor 5 with respect to the shaft of the lead or reference motor.

The output pulses generated in counters 12 and 13 are fed into the pulser-drivers 14 and 15, respectively, to provide output pulses of the same amplitude and time duration width. These latter pulses are then fed into the coincident pulse canceller 17 which permits the pulse from one pulser to pass through to input of signal generator 18, if a preceding pulse from the other pulser precedes it in time by an amount greater than a given amount, say 100 microseconds. If the time phase between any successive pulses from the two pulsers is less than the given time apart, both are effectively canceled and will not pass through to signal generator 18. This cancellation of coincident, or near coincident, pulses eliminates unnecessary operation of generator 18.

Signal generator 18 is essentially a reversible shift register which shifts a single information "bit" between five information storage elements. It differs from normal reversible shift registers in that the information "bit" can never be cleared out of the end storage elements, and under certain conditions of input signals the "bit" stays in the end storage elements. As will hereinafter be described in detail, the storage elements of generator 18 are provided with two sets of gates, one set being excited by the reference generator initiated pulses supplied to it from one output terminal of pulse canceller 17 to shift the information "bit" from left to right, between storage elements. The other set of gates when excited by the tachometer generator initiated pulses supplied to it from the other output terminal of pulse canceller 17 shifts the "bit" from right to left between storage elements.

As pulses initiated by the reference generator are interspersed between pulses initiated by the tachometer generator, the information "bit" circulates back and forth between adjacent storage elements. If the lead or lag is below a predetermined deviation limit the "bit" will stay in the center storage element. As the lead or lag exceeds such limit, but is below another upper limit, the "bit" circulates back and forth between the center element, and one of the storage elements immediately adjacent at either side thereof. When the "bit" is in one of the last mentioned storage elements a positive voltage of a predetermined magnitude is supplied to an input of summer-integrator 7, and when in the other a positive output voltage of a similar magnitude is supplied to another input of summer-integrator 7. The duration of such positive output voltage is dependent upon the time periods that the "bit" is in the storage elements immediately to the right or left of the center storage element. Such voltages are of a pulse like character, but are in effect analog quantities whose volt-second content are directly proportional to the lag or lead between motor 5 and the reference generator for any given reference frequency.

When the lead or lag exceeds the aforementioned upper limit the "bit" circulates back and forth between one of the outermost storage elements and the storage element between it and center storage element. Because of the interposition of an "OR" logic circuit, the positive output voltage to the input of signal generator 18 will be continuous so long as the "bit" remains in one of the two outermost storage elements or those adjacent thereto.

It may be assumed that when one of positive voltage is supplied from generator 18 to one of the inputs summer-integrator 7 that the latter responds to increase the output of power supply to motor 5 to thus cause it to speed up and get back in position phase step with the reference generator. Conversely, when the other positive voltage is supplied to summer-integrator 7 the latter responds to decrease the output of power supply to motor 5 so that the latter will be slowed down to bring it back within desired limits of phase deviation with the reference generator.

The various portions of the control for motor 5 will now be described in detail with particular reference to FIGS. 2a, 2b and 2c, which should be alined from left to right in the order named to depict the complete control system. All transistors employed in the various portions of the control system have their emitters connected to ground and the common DC voltage source used has ground at 0 volts and the other side at −10 volts.

Motor 5 may be assumed to have an armature 5a and a shunt field winding 5b that is supplied with a DC excitation voltage. The armature 5a is connected to be supplied with a regulatable voltage from power supply 6.

*Power supply*

Power supply 6 comprises a generator 19 which has its armature 19a connected in a loop circuit with the armature 5a of motor 5. The armature 19a may be assumed to be driven at a constant speed by prime mover PM. Generator 19 has a shunt field winding 19b that is connected to the output of summer-integrator 7. The voltage output of generator 19 to the armature 5a as will be readily understood, will vary directly as the voltage supplied across the shunt field winding 19a.

*Signal summer-integrator*

Summer-integrator 7 in one preferred form is essentially a magnetic amplifier supplying a variable DC output voltage to shunt field winding 19b in accordance with the excitation of a plurality of control windings. More particularly, it can comprise a magnetic amplifier 20 having main AC power windings 20a and 20b and control windings 20c, 20d, 20e, 20f and 20g. Winding 20a is connected at its upper end to line L1 of a source of signal phase AC voltage and at its other end is connected in series with a half-wave rectifier 21 to one input terminal of a full-wave rectifier bridge 22 which has its other input terminal connected to line L2 of the AC voltage source. Winding 20b has one end connected to line L1 and its other end is connected in series with a half-wave rectifier 23 to the point common between rectifier 21 and the first mentioned input terminal of rectifier bridge 22.

One end of each of the control windings is connected to −10 volts potential as shown and the other ends will be subjected to potentials varying between −10 and 0 volts as will hereinafter be more fully explained.

*Speed and reference pulsers*

Pulsers 8 and 9 are identical, and description of pulser 8 which is shown in detail in FIG. 2a will suffice for an understanding of both.

Pulser 8 has an input terminal 25 which is connected to the base of transistor T1 in series with a resistor R1. Transistor T1 has its emitter connected to ground or 0 volts potential, and has its collector connected to one end of a resistor R2 and one plate of a capacitor C1. A second transistor T2 has its emitter connected to ground and has its collector connected to one end of a resistor R3, and to the output terminal 26. The base of transistor T2 is connected to the point common between the other plate of capacitor C1 and an end of a resistor R4. Corresponding ends of resistors R2, R3 and R4 are connected to a −10 volt source. The base of transistor T1 is connected through a resistor R5 to ground and is also connected in series with a resistor R6 to the point common between output terminal 26 and the collector of transistor T2.

With ground potential at input terminal 25 transistor T1 will be non-conducting and its collector is then at −10 volts. Due to emitter to base current flow transistor T2 will be conducting. Thus its collector, and hence output terminal 26 will be at ground. If a negative going pulse, such as that depicted at 10a in FIG. 3, is then impressed on input terminal 25, the base of transistor T1 will be made suddenly negative with respect to its emitter, and transistor T1 will turn on. The collector of transistor T1 will suddenly shift from −10 to 0 volts and a transient charging current will then flow through capacitor C1 and resistor R4. Consequently, the base of transistor T2 will go suddenly positive to turn off the latter and the potential at output terminal 26 suddenly shifts from 0 to −10 volts. Feedback from the collector of transistor T2 back to the base of transistor T1 provides a trigger action and insures "snap action" even though the negative input pulse signal does not have a sharp negative drop.

The potential on the base of transistor T2 immediately decreases toward −10 volts and when its base goes slightly negative, emitter to base current again flows and transistor T2 turns on again to shift its collector, and hence output terminal 26 back to 0 volt. A negative output pulse is thus generated at output terminal 26 whose form is like that depicted at 8a of FIG. 3. Such a pulse will be generated for every input pulse 10a at terminal 25 and will have a constant amplitude and duration. The duration of the pulses 8a are dependent upon the RC time constants of capacitor C1 and resistor R4.

Output terminal 26 of pulser 8 is connected through a conductor 27 to the ungrounded end of "speed reference" control winding 20C of amplifier 20. The output terminal 29 of pulser 9 is similarly connected through a conductor 30 to the ungrounded end of "speed feedback" control winding 20d.

Reference pulse generator

Reference pulse generator 10 is depicted in FIG. 2a as being a multivibrator transistor oscillator whose pulse output rate may be varied within limits. More particularly it comprises a transistor T3 having its emitter connected to ground and its collector connected to an output terminal 28, and in series with a resistor R7 to −10 volt potential. Its base is connected in series with a capacitor C3 to the collector of another transistor T4 which has its emitter connected to ground. The collector of T4 is connected in series with a resistor R8 to −10 volts. The base of transistor T4 is connected in series with a capacitor C4 to terminal 28, and is also connected in series with a fixed resistor R9 and a variable resistor R10 to −10 volts. The base of transistor T3 is similarly connected in series with a fixed resistor R11 and variable resistor R12 to −10 volts. Output terminal 28 is connected through a conductor 33 to the input terminal 25 of pulser 8, and through the latter conductor and another conductor 34 to the input terminal 35 of counter-scaler 12.

Let it be assumed initially that transistor T3 is conducting so that its collector, and hence terminal 28, will be at 0 volt. The left-hand plate of capacitor C4 will be shifted from −10 to 0 volts and a charging current will flow through the latter and resistors R9 and R10 to −10 volts. This suddenly shifts the base of transistor T4 to a potential rendering the latter non-conducting and as capacitor C4 charges, the potential on the base of transistor T4 decreases to a value rendering the latter conducting again. The collector of transistor T4 then is shifted to 0 volt and consequently the left-hand plate of capacitor C3 shifts from −10 to 0 volts. Charging current then flows through capacitor C3 and resistors R11 and R12 to −10 volts. Initially this jerks the potential of the base of transistor T3 positive and the latter is suddenly rendered non-conducting. Thus, as depicted by the pulses 10a in FIG. 3, the collector and output terminal 28 suddenly drop from 0 to −10 volts. As the flow of charging current subsides the potential of the base of transistor T3 gradually increases and the latter correspondingly turns on to raise its collector potential and that of terminal 28 to 0 volts. The cycle then repeats itself providing a train of pulses at a predetermined frequency as depicted by the pulses 10a of FIG. 3.

Adjustment of the resistance values of resistors R10 and R12 will effect change in the frequency rate of the pulses at output terminal 28. If a greater pulse frequency is required capacitors of different values may be provided, and may be connected in parallel with capacitors C3 and C4 by provision of suitable switches and connections therefor.

As will be understood, the multivibrator transistor oscillator pulse generator hereinbefore described can be replaced by other forms of pulse generators. Where great stability and constancy of pulse frequency is desired, crystal controlled types of oscillators could be used. The multivibrator type is shown here because of its simplicity and ease of understanding.

Tachometer pulse generator

Generator 11 is shown as comprising a magnetic toothed wheel 38 coupled to the shaft of motor 5 to be driven in exact synchronism therewith. It further comprises an impulse coil 39 and a magnetic core 40. As the teeth of wheel 38 successively pass the adjacent end of core 40 voltage pulses will be generated in coil 39 of the form shown in 11a in FIG. 3. Coil 39 has one end connected to "ground" and its other end connected through a conductor 41 to input terminal 42 of pulser 9 and to input terminal 43 of counter 13. Generator 11 will provide pulses having the wave form depicted by 11a in FIG. 3. However, any means to provide pulses of a given amplitude and number per revolution of the motor shaft, would be satisfactory.

Pulse counter-scalers

The counter-scalers 12 and 13 are identical, and only 12 is shown and will now be described in detail.

Counter 12 is a binary counter capable of registering a binary count up to 16. As will hereinafter be more fully explained, it is connected to provide a positive going voltage for each fourth input pulse in every series. In other words assuming a steady train of input pulses, the counter provides positive going voltage fronts of a frequency equal to one fourth of the input frequency at terminal 35. The time required to register a given quantity of positive going voltage fronts is as constant as the reference frequency generated in the digital reference 10. In the case of counter 13 which is supplied with positive going voltage fronts which vary in frequency, the time required to register a given quantity of voltage fronts change with the speed of motor 5.

More particularly, counter 12 comprises four register elements having pairs of transistors T5–T6, T7–T8, T9–T10 and T11–T12 connected respectively as direct coupled "flip-flops." Transistors T5, T7, T9 and T11 when conducting provide registration of a binary "0" in their respective elements, and T6, T8, T10 and T12 when conducting provide registration of a binary "1" in their respective elements. The collectors of transistors T6, T8, T10 and T12 are connected to pulse output terminals 12W, 12X, 12Y and 12Z which provide output pulses of 2, 4, 8 and 16 count durations, respectively. As shown output terminal 12X is externally connected through a conductor 45 to the input terminal 46 of pulser 14, and this produces output pulses having a frequency corresponding to one fourth of the input pulse frequency.

Let it be assumed that initially transistors T5, T7, T9 and T11 are conducting and T6, T8, T10 and T12 are non-conducting corresponding to a "zero" binary count condition. As the first input pulse is supplied from generator 12 through terminal 35 to capacitor C5 or capacitor-diode gate C5–CR1, the negative going portion has no effect, but as the wave front goes positive current flows from the collector of T5 through resistor R16, diode CR1 and resistors R18 and R20 to the conductor 47 which is at −10 volts. This raises the potential of the base of T5 to a value rendering the latter non-conducting. Consequently, the collector of T5 is then shifted to −10 volts and as the base of T6 is connected to the collector of T5, emitter-base current flows from conductor 48, which is connected to ground through the emitter-base circuit of transistor T6 and resistors R14 and R13 to conductor 47. This causes T6 to turn "on" and its collector is shifted from −10 to 0 volts. In the interim the potential on input terminal 35 returns to zero, but the capacitor-diode gate C6–CR2 prevents current flow from the collector of T6 through R21, CR2 and resistor R14 to the collector (0 volts) of T5. When the next (second) input pulse to terminal 35 goes positive the C6–CR2 gate opens to allow current flow through the last mentioned circuit, and, as a result the potential on base of T6 is raised sufficiently to render the latter non-conducting. The collector of T6 shifts from 0 to −10 volts due to connection of the base of T5 through resistor R18, the T5 transistor is rendered conducting again.

Reconduction of T5 shifts its collector from −10 to 0 volts and as a result current flows from the latter collector through conductor 49 to capacitor C7 of the capacitor-diode gate C7. As a result current flows from the collector of T7 through resistors R25, R26, diode CR3 and resistors R28 and R30 to conductor 47. This causes T7 to turn "off," and in so doing causes T8 to turn "on" in the same manner as described in connection with the T5–T6 transistor pair. The capacitor-diode gate C8–CR4 is ineffective upon the application of the positive pulse through conductor 49 because the collector of T8 is then at −10 volts, and no current will flow through diode CR4.

The fourth input pulse will cause T8 to turn "off" and T7 to turn "on" again as aforedescribed in conjunction with the transistor pair T5–T6. When T7 becomes reconducting again a positive pulse is sent from the collector of the latter through conductor 50 to capacitor C9 to actuate capacitor-diode gate C9–CR5 to render T9 non-conducting and T10 conducting. During the same input pulse T5 will turn "off" and T6 turn "on" again. During the next three input (fifth through seventh) pulses to terminal 35, T10 remains conducting and T9 remains non-conducting. T5–T6 alternate their conducting states every pulse and T7–T8 every two pulses. This results in a positive going voltage from the T8 collector for each 4 input pulses.

As will be understood T12 will continue conducting through the registration of the fifteenth count of any series, and the pairs T5–T6, T7–T8, T9–T10 would alter their states in that interim in the manner aforedescribed. T10 would then commence conducting on the registration of the 12th input pulse and remain "on" until the 16th input pulse is registered. On completion of the 15th input pulse T6, T8, T10 and T12 would all be conducting providing a binary registration equivalent to the decimal count "15." When the next or sixteenth input pulse is fed to input terminal 35 the counter recycles back to a binary state equivalent of decimal "0" wherein T5, T7, T9 and T11 are conducting and their complements T6, T8, T10 and T12 are all non-conducting.

The function of the counter 12, therefore, is to provide positive going voltage fronts for operation of shift register 18. However, with the particular pulse canceller shown in FIG. 2b, the shift register actually operates on the positive going voltage from the clock 16. With other forms of pulse cancellers the shift register 18 could be made to operate as a function of the positive going voltage from counter 12. These voltage fronts are produced in quantities of ½, ¼, ⅛ and ⅟₁₆ of the quantity of input pulses at terminal 35, at terminals 12W, 12X, 12Y, and 12Z of counter 12, respectively. The pulses produced by pulser 14 as a result of the inputs from counter 12, are therefore substantially constant amplitude, constant width pulses of a frequency equal to ½, ¼, ⅛ or ⅟₁₆ of the input frequency at terminal 35 of counter 12, depending on which of the counter terminals is connected to conductor 45.

It will be apparent that conductor 45 can be connected as desired to any one of the other output terminals 12V, 12W, and 12Z if a different number of output pulses is desired from counter 12. If a longer count than that available from counter 12 above is desired, an identical unit can be connected in tandem by connecting the input terminal 35 of the second unit to the terminal 51 which has connection through conductor 52 to the collector of transistor T11. With two counters so connected in tandem, a registration of counts up to 256 will be available, and output voltage fronts having a period corresponding to 32, 64, 128 and 256 pulses may additionally be obtained.

A "reset" terminal 53 is provided in counter 12 and it is connected by a conductor 54 and through parallel resistors R17, R27, R36 and R46 to the base of transistors T5, T7, T9 and T11, respectively. Regardless of the registration state in the counter the application of a negative voltage pulse on terminal 53 will render the bases of T5, T7, T9 and T11 sufficiently negative so that they will be rendered conducting causing turn-off of their complements T6, T8, T10 and T12. This permits the counter to be "cleared" if desired. However, in the present control system "clearing" is not essential at start-up.

Counter 13 as aforedescribed is a duplicate of counter 12 and has output terminals 13W, 13X, 13Y and 13Z corresponding to those for counter 12. Both counters must be connected to their associates pulsers 14 and 15 to provide the same ratio of output pulses to input pulses. As shown, the output terminal 13X is connected through a conductor 56 to the input terminal 57 of pulser 15.

*Clock*

The clock 16 provides simultaneous control gating in the pulser-drivers 14 and 15, and in the coincident pulse canceller 17 as will hereafter be explained in detail. It comprises a transistor multivibrator oscillator having transistors T13 and T14, and an inverter amplifier transistor T15. The collectors of T13 and T14 are connected through resistors R51 and R52 respectively, to −10 volts. Their bases are connected through resistors R53 and R54, respectively, to −10 volts. The base of T13 is connected in series with a capacitor C13 to the collector of T14, and the base of the latter is connected in series with a capacitor C14 to the collector of T13. Transistor 15 has its base connected in series with a resistor R55 to ground. The collector of T15 is connected in series with a resistor R56 to −10 volts, and through a conductor 60 to input terminal 61 of pulser-driver 15, and through a conductor 62 to input terminal 63 of pulser-driver 14. It is also connected through conductor 64 to the input terminals 65 and 66 of coincident canceller 17, respectively. The base of T15 is connected in series with a resistor R57 to the collector of T14.

Transistors T13 and T14 alternate "on" and "off" in a well known manner at a frequency determined by the RC time constants of C13–R53 and C14–R54. When T14 is non-conducting the base of transistor T15 will be sufficiently negative to render it conducting, and hold its collector at near "ground" or 0 volts. When T14 is rendered conducting its collector is shifted from −10 to near 0 volts potential which renders T15 non-conducting and its collector voltage shifts from 0 to −10 volts. Consequently a series of negative pulses of a predetermined frequency and duration width are imposed upon the input terminals 63 and 61 of pulser-driver 14 and 15 and terminals 65 and 66 or coincident pulser canceller 17 to insure that these devices only operate on the positive going portions of each of the clock pulse wave fronts. In FIG. 3 the pulse train 16a depicts the form of clock output pulses provided by clock 17.

Pulser-drivers

Pulser-driver units 14 and 15 are identical and only unit 14 is shown in detail and will now be described.

Input terminal 46 of unit 14 is connected in series with the resistor R58 and diode CR9 of a capacitor-diode gate C15–CR9 to base of a transistor T17 of a flip-flop pair T17–T18. Transistors 17 and 18 have their bases connected to ground in series with resistors R59 and R60, respectively. Their collectors are connected to −10 volts in series with resistors R61 and R62, respectively. The base of T17 is connected in series with a resistor R63 to the collector of T18, and the base of T18 is connected in series with a resistor R64 to the collector of T17.

The base of transistor T18 is connected in series with a resistor R64 to terminal 68 which is connected through a conductor 69 to input terminal 70 in coincident pulse canceller 17. Transistor T17 has its collector connected to the collector of a transistor T19 which has its collector connected to input terminal 46 in series with a resistor R66. The base of the latter transistor is connected to ground in series with a resistor R67.

The collector of transistor T18 is connected in series with a resistor R68 and a capacitor C14 to the base of transistor T20 which is also connected in series with a resistor R69 to −10 volts. T20 has its collector connected in series with a resistor R70 to −10 volts and also to the base of transistor T21 in series with a resistor R71. The collector of T20 is also connected to the point common between resistor R65 and terminal 68. Transistor T21 has its collector connected to −10 volts in series with a resistor R72 and its base connected to ground in series with a resistor R73. The collector of T21 is connected to an output terminal 71 which has connection through a conductor 72 to the input terminal 73 of pulse canceller 17.

Pulser-driver 15 has the output terminals 74 and 75 corresponding to terminals 68 and 71 of pulser-driver 14. Terminal 74 is connected to an input terminal 76 of canceller 17, and terminal 75 is connected to input terminals 77 of the latter.

With input terminals 46 and 63 subjected to −10 volts respectively, pulser-driver 14 has a −10 volt at its output terminal 71. In this state transistor T17 will be conducting which will in turn hold T18 non-conducting so that the collector of the latter will be at −10 volts. Transistor T20 will be conducting and its collector will thus be at 0 volts. Capacitor C4 will be 0 volts on its right-hand plate and its left-hand plate will be −10 volts. With the collector of T20 at 0 volts transistor T21 will be held non-conducting with the result that output terminal 71 will be at −10 volts.

Now let it be assumed that the output voltage at terminal 12X of counter 12 shifts from −10 to 0 volts raising input terminal 46 to the latter potential. If the voltage at input terminal 63 is still at −10 volts nothing will change that state of pulser-driver 14 due to the blocking action of capacitor-diode gate C13–CR9. Now when the output pulse from clock 16 goes positive, the voltage at input terminal 63 shifts to 0 volts and current will flow from terminal 63 through resistor R58, diode CR9, resistors R59, R63, and R62 to −10 volts. As a result the potential of the base of transistor T17 is raised to a point rendering the latter non-conducting to shift the potential of its collector from 0 to −10 volts. As a result, transistor T18 is rendered conducting and its collector is suddenly shifted to 0 volts. Capacitor 14 then discharges through resistor R69 to −10 volts and the transient high rate of current flow momentarily raises the potential of the base of transistor T19 to a value rendering it non-conducting. Consequently transistor T21 turns on to shift its collector and hence output terminal 71 from −10 to ground. As the rate of discharge current from capacitor C14 subsides, transistor T20 becomes conducting again which effects turn "off" of transistor T21, and this causes the collector of the latter and terminal 71 to shift back to −10 volts. The output pulses at terminal 71 will have the form depicted by 14a in FIG. 3.

A positive going output pulse of a given time duration will be generated at terminal 71 following each impression of a positive going pulse at input terminal 46 from counter 12 and following receipt of the first positive going wave front of a clock pulse at terminal 63, providing that the pulse at terminal 46 exists for a predetermined minimum time interval prior to receipt of the clock pulse at terminal 63. If the input pulse at terminal 46 exceeds some time duration, say 50 microseconds, feedback from the collector of transistor T20 through resistor R65 to the base of transistor T18 insures that the latter will "lock-up." This feedback will endure for an interval determined by the C14–R69 time constant, but conduction "lock-up" of transistor T18 will be accomplished prior to expiration of the last mentioned interval.

Similar output pulses 15a (see FIG. 3) are afforded at the output terminal 75 of pulser-driver 15 each time an input pulse from the counter 13 is impressed on input terminal 57, and the positive going wave front of a clock pulser is thereafter impressed on terminal 61.

Transistor T19 insures that the "flip-flop" pair T17–T18 will reset back to the T17 "conducting" and T18 "non-conducting" states when an input pulse at terminal 46 goes negative. If the input pulse at terminal 46 should go negative just before a positive going wave front of a clock pulse is impressed on terminal 63, capacitor-diode gate C13–CR19 might stay open because it requires a finite amount of time to deenergize. However, T19 gives a rapid reset, because when the input pulse at terminal 46 goes negative it immediately becomes conducting to short the collector of T17 to ground, and hence the base of transistor T18 will be raised to a potential rendering it non-conducting, which in turn causes reconduction of T17.

Coincident pulse canceller

Coincident pulse canceller 17 has two sets of input terminals; the upper set comprising terminals 73, 65 and 76, and the lower set comprising terminals 70, 66 and 77. Terminals 73, 65 and 76 are connected in series with resistors R74, R75 and R76, respectively, to the base of a transistor T22 which is also connected to ground in series with a resistor R77. Transistor T22 has its collector connected to an output terminal 80, to −10 volts in series with a resistor R78, and to ground in series with a resistor R79.

Transistor T22 together with its base and biasing resistors constitutes a three leg "AND" logic circuit. When any of the voltages at input terminals 73, 65 and 76 are at −10 volts, T22 will be conducting to hold its collector, and hence output terminal 80 at ground.

The other set of input terminals 70, 66 and 77 are connected in series with resistors R80, R81 and R82 to the base of a transistor T23 which is also connected to ground in series with a resistor R83. Transistor T23 has its collector connected to an output terminal 81, to −10 volts in series with a resistor R84, and to ground in series with a resistor R85. Transistor TR23 with its base input and other bias resistors comprises another three leg "AND" logic circuit like that first mentioned.

Now considering the first mentioned "AND" circuit, if the potentials at terminal 73, 65 and 76 are all at ground, then T22 will be rendered non-conducting to shift the potential at output terminal 80 from ground to −10 volts to provide a negative going pulse as shown at 80a in FIGS. 3a to 3c. As will be appreciated, this requires that there simultaneously be positive output pulses at terminal 71 of pulser-driver 14, at the collector of T15 in clock 16, and at terminal 74 of pulser-driver 15. This will occur provided pulser-drivers 14 and 15 are not simultaneously providing negative going pulses at the instant a clock pulse goes positive at terminal 65. If pulser-driver 15 should have a positive output pulse at its terminal 75, this means its terminal 74, which is the counterpart of terminal 68 in pulser-driver 14, will be at −10 volts, and hence transistor T22 will continue to conduct thereby holding output terminal 80 at ground.

Similarly, the second mentioned "AND" circuit will provide a negative pulse 81a, FIGS. 3a to 3c, at output terminal 81, whenever the voltages at terminal 70, 66 and 77 are all at ground. If there is a positive output pulse at terminal 75, the positive going wave front of the next clock pulse at terminal 66 will render completion of the "AND" circuit if pulser-driver 14 is not at the same time providing a positive output pulse at its terminal 71 and a negative output pulse at its terminal 68. The latter output pulse would, of course, maintain the second mentioned "AND" circuit at −10 volts and terminal 81 would thus remain at ground.

Output terminal 80 is connected through a conductor 84 to the input terminal 85 of phase displacement signal generator 18, and in series with a capacitor C15 and a diode CR10 to the base of transistor T24. Output terminal 81 is connected through a conductor 86 to a second input terminal 87 of signal generator 18 and is also connected in series with a capacitor C16 and a diode CR11 to the base of transistor T24. The point common between capacitor C15 and diode CR10 is connected to ground through a resistor R86, and the point common between capacitor C16 and diode CR11 is connected to ground through a resistor R87. Transistor T24 has its base and collector connected to −10 volts in series with resistors R88 and R89, respectively, and also has its collector connected to an output terminal 88. Output terminal 88 is connected through a conductor 89 to a third input terminal 90 of signal generator 18.

It will be appreciated that transistor T24 with its base resistor and capacitor diode gates C15–CR10 and C16–CR11 constitutes two leg "OR" logic circuit. When either of the terminals 80–81 is at −10 volts the base of transistor T24 will be at a potential rendering the latter conducting to place the collector of the latter, and hence terminal 88, at 0 volts. In other words, any time a negative pulse is generated at either of the terminals 80 or 81, a following negative pulse will be generated at output terminal 88.

It will also be appreciated from the foregoing that generation of a negative output pulse 80a at terminal 80 requires successive input pulses from pulser-driver 14 and clock 16 and absence of a negative going inhibiting input pulse from pulse generator 15. Similarly the generation of a negative output pulse 81a at terminal 81 requires successive positive going pulses from pulser-driver 15 and clock 16 and absence of a negative going inhibiting pulse from terminal 68 of pulser-driver 14. Thus if input pulses at terminals 46 and 57 of pulser-drivers 14 and 15 occur within a some predetermined interval (say less than 100 micro-seconds duration) they will be effectively canceled and not passed on to any of the input terminals 85, 87 and 90 of signal generator 18.

*Phase displacement signal generator*

Signal generator 18 comprises a novel form of reversible shift register in which a single bit (binary "1") is reversibly shiftable between five information storage elements in accordance with the frequency and sequence of the negative going pulses impressed upon its input terminals 85 and 87. The shift register comprises the information storage elements designated I, II, III, IV, and V from left to right in FIG. 2b. Elements I and II have flip-flop transistor pairs T25–T26 and T27–T28, respectively. Elements III and IV are internally like element II so the details thereof are omitted for simplicity. Elements I, II, IV and V have output terminals 94, 95, 96 and 97 respectively, while element III has no comparable output terminal.

Output terminal 94 is connected in series with a diode CR13 and a resistor R91 to the base of transistor T31, and output terminal 95 is connected in series with a diode CR14 and resistor R91 to the base of transistor T31. The base of transistor T31 is connected to ground in series with a resistor R92 at its collector and is connected in series with a resistor R93 to −10 volts, and directly to the base of a transistor T32. The point common between diodes CR13 and CR14 and resistor R91 is connected to −10 volts in series with a resistor R94. Transistor T32 has its collector connected to −10 volts in series with a resistor R95 and to output terminal 98 which is connected through a conductor 99 to an end of position correction signal winding 20e of magnetic amplifier 20.

With terminals 94 and 95 at −10 volts, which obtains when the bit "1" is not in either of the register elements I and II, transistor T31 will be conducting due to current flow from ground through its emitter and base and resistors R91 and R94 to −10 volts. Thus the collector of T31 will be at ground and transistor T32 will be held nonconducting. Consequently, the collector of T32 and hence output terminal 98, will be at −10 volts with the result that no current will flow through control winding 20e. Now when the bit "1" is in either element I or II, one or the other of the output terminals 94 and 95 will be at ground potential, and current will then flow through either diode CR13 or CR14 and resistor R94 to −10 volts. This will cause the base of transistor T31 to rise to a potential rendering the latter non-conducting. Consequently, the collector of T31 is shifted to below ground potential thus causing emitter to base current flow in transistor T32 to effect conduction of the latter. When T32 becomes conducting, the potential of its collector, and hence terminal 98, shifts from a −10 volts to ground which causes current flow in control winding 20e of amplifier 20 to decrease the output of this amplifier to field winding 19b of generator 19.

It will be seen that the portion of the circuit just described between terminals 94 and 95 of register elements I and II and output terminal 98 comprises a transistor amplifier-inverter circuit with a two leg "OR" input gate. A similar circuit designated by the rectangle 100 is connected between output gates 96 and 97 of register elements IV and V and an output terminal 101 which is connected through a conductor 102 to an end of position correction control winding 20f of amplifier 20. When bit "1" is in either of the elements IV and V terminal 101 will be at ground potential, thus causing current flow in winding 20f to effect an increase in the output of amplifier 20 to field winding 19b of amplifier 19. It will be observed that when bit "1" is in the center element III both of the windings 20e and 20f will be deenergized. Thus no position correction control is afforded when bit "1" is in element III.

The manner in which the bit "1" is shifted between elements I to V will now be described. Assume initially that it is in element II, which means that transistor T28, will be conducting, and T27, will be non-conducting. Transistor T25, T29 and those corresponding thereto in elements III and IV will be conducting, and transistors T26, T30 and those corresponding thereto in elements III and IV will be non-conducting. Now let it be assumed that the motor speed is increasing relative to the reference speed and the next negative going pulse from pulse canceller 17 is impressed at input terminal 87. The lower plate of capacitor C18 will then be at −10 volts and current will flow from ground through the emitter-collector circuit of T28, resistor R100 and capacitor C18 to charge the latter. When terminal 87 thereafter goes positive at the end of the impressed negative pulse the upper plate of C18 suddenly goes sharply above ground potential and a positive transient pulse is impressed on the base of transistor T25 to turn the latter off. Consequently, transistor T26 is rendered conducting to shift output terminal 94 to ground potential.

When input terminal 90 is subjected to a following negative going "clear" pulse, due to turn off of transistor T24 in pulse canceller 17, current will flow through the emitter and base of collector of transistor T27 and resistor R106 and this results in conduction of T27 with the consequent result that T28 will be rendered non-conducting. The same action will occur in transistor T29 of element V, and the corresponding transistors of elements III and IV, but as these transistors are already conducting, no change will occur in those elements. The discharge potential of capacitor C18 remains sufficiently high during the interval of the "clear" pulse that the latter is over-ridden and thus cannot render T25 conducting.

With bit "1" in register I, let it be assumed that the next negative going pulse is again impressed at input terminal 87. As the collector of T26 is then at ground, current will flow therefrom through diode CR15 and capacitor C18 to terminal 87 etc. to −10 volts. The following negative going "clear" pulse at terminal 90 causes a high transient potential at the upper rate of capacitor C18 which maintains T25 non-conducting, and thus T26 conducting. Thus bit "1," when a succession of pairs of transfer and clear pulses are impressed at terminals 87 and 90, stays in element I.

Assume that bit "1" is in element I, and that the next negative going transfer pulse is impressed on terminal 85. Current will then flow from the collector of T26 through resistor R105, capacitor C19 to charge the upper plate of the latter to ground potential. When the last mentioned negative pulse goes positive the upper plate of capacitor C19 is subjected to a transient and suddenly goes above ground potential thereby raising the potential on the base of transistor T27 to a value rendering it non-conducting. When T27 is made non-conducting T28 is thereby rendered conducting so that bit "1" is thus shifted from element I to element II. The following negative going clear pulse impressed at terminal 90 causes current flow through the emitter-collector circuit of transistor T25 and resistor R99 to render the latter transistor conducting and its companion transistor T26 non-conducting.

If the next negative going transfer pulse from pulse canceller 17 is impressed on terminal 85, bit "1" will be shifted from element II to element III. So long as no intervening pairs of transfer and clear pulses are impressed at terminals 87 and 90 between pulses impressed on terminals 85 and 90, bit "1" will continue to shift from left to right successively until it is stored in element V. However, an intervening negative pulse at terminals 87 and 90 will cause bit "1" to be shifted from right to left, say from IV to III.

When the angular displacement of the shaft of motor 5 comes into exact correspondence with the position dictated by the pulse frequency of digital reference generator 10, bit "1" will be in center element III which as aforestated, means that control windings 20e and 20f will both be deenergized. With slight variation between the actual and reference angle of the shaft of motor 5, bit "1" will circulate between element III, and either of the elements II and IV. The relative durations of the bit "1" in elements III and II, or III and IV, being indicative of the average out of phase displacement.

The graphic representations 18a and 18b in FIG. 3 illustrate the positive pulses of varying duration provided at output terminals 98 and 101, respectively, of signal generator 18. At the left-hand side, where 18b is positive, a condition of the motor shaft lagging the equivalent position specified by reference generator 10 is depicted. The width of the pulses 18b is directly in accordance with the degree of lag up to a predetermined amount. In other words, the volt-second content in such pulses provides, in effect, an analog control signal proportional to the position phase lag of the motor.

The central portion of the diagram shows a condition where 18a and 18b are at −10 volts continuously, indicating that the phase lead or lag of the motor shaft is within the desired limits. Any slight change in lag or lead causes bit "1" to circulate from storage element III to element II and back, or to element IV and back.

The right-hand portion of the diagram shows a condition where the pulses 18a are positive almost continually, indicating a condition where the motor phase position leads the equivalent position developed by reference generator 10 by a considerable amount. In this situation bit "1" is either in storage element IV or V continuously until the frequency of pulses from the reference output terminal 80 exceeds that of feedback terminal 81.

In a preferred embodiment tachometer generator 11 provides 180 output pulses from its coil 39 for each revolution of the shaft of motor 5. Thus one pulse is generated each 2° of shaft rotation. With counter 13 connected to provide a positive going pulse wave front at intervals of every 4 input pulses, then pulser-driver 15, acting through pulse canceller 17 would provide paired pulses at terminals 87 and 90 every 8° of shaft rotation; assuming no cancellations of such pulses in canceller 17. Neglecting intervening paired pulses at terminals 85 and 90, bit "1" could be shifted from right to left between successive storage elements each 8° of motor shaft rotation. In the case of a motor lagging condition there would be a corresponding shift from left to right every 8° of motor shaft rotation. Under normal disturbance conditions, the position regulator portion would then regulate the motor shaft portion within ±8° of the equivalent position dictated by the reference generator 10.

When the bit "1" is alternating between either pair of the elements, III and II, or III and IV, this means a position deviation of 8° or less. When the bit is alternating between either pair of the elements, II and I or V and IV, this means a position deviation of 8° to 16°. In the event the deviation is more than 16°, bit "1" sticks in either of the elements I or V and such excess deviation is disregarded. Of course, full position correction control is "on" in one sense when bit "1" circulates between elements I and II, and is full on in the other sense when bit "1" circulates between elements IV and V.

The position regulator part of the control system does not make up lost, or dispose of gained portions of a revolution in excess of 16°, but regulates to effect correspondence to the nearest 16° of shaft rotation. If it is desired to regulate to a smaller angular deviation, counters 12 and 13 should be connected to provide positive going pulse wave fronts at lower numerical count intervals, e.g. every 2 input pulses, in which case the system would regulate to maintain a ±4° difference. Also, increasing the pulses per revolution generated by tachometer generator 11 will cause the system to regulate to a smaller deviation. Adding further counting modules to the counters 12 and 13 will permit even wider ranges of regulation of position deviation.

We claim:

1. For controlling an electric motor, in combination, means for generating reference pulses at a predetermined frequency, means for supplying pulses at a frequency which varies with the speed of said motor, a first counter subjected to said reference pulses to provide first output pulses of a duration in accordance with the period required to register a given number of said reference pulses, a second counter responsive to the pulses which vary in frequency with the speed of said motor to provide second output pulses of a duration in accordance with the period required to register an equal number of pulses, means responsive to said first and second counter output pulses to provide alternatively first phase control pulses of constant magnitude and with durations varying in accordance with the phase lead between said first and second output pulses, second phase control pulses of constant magnitude and with durations varying in accordance with the phase displacement between said first and second phase and no phase control pulses when the first and second counter output pulses are in phase, means subjected to said first and second phase control pulses to provide an analog control signal which varies as a function of the phase displacement between said first and second phase control pulses with respect to time, and means under the direction of said analog control signal for varying the energy supplied to said motor in accordance with its magnitude.

2. The combination according to claim 1, wherein said means responsive to said first and second counter pulses comprises a reversible shift register wherein a single information bit is circulated between a plurality of storage elements in accordance with the phase lead or lag between said first and second counter pulses, wherein said first phase control pulses are provided when the information bit is in any storage element on one side of a center storage element, wherein said second phase control pulses are provided when said information bit is in any storage element on the other side of said center storage element, and wherein no phase control pulses are provided when said information bit is in said center storage element.

3. The combination according to claim 2, wherein the end-most register storage elements on opposite sides of said center storage element are provided with means holding the information bit in one or the other thereof, when the lead or lag between said first and second counter pulses exceeds a predetermined amount.

4. The combination according to claim 2, wherein said means responsive to said first and second counter pulses further comprises means subjected to said first and second counter pulses to provide corresponding pulses of substantially constant magnitude and duration which are fed to respective ones of two sets of input gates of the shift register.

5. The combination according to claim 1, wherein said means subjected to said first and second phase control pulses comprises an amplifier having at least two control inputs, and being supplied with said first and second phase control pulses, respectively, opposite amplifier output effects.

6. The combination according to claim 5, wherein said amplifier has at least two other control signal inputs and wherein like means are connected to each of the latter inputs and are subjected, respectively, to said reference pulses and said pulses varying in frequency with the speed of said motor to supply said two other amplifier control signal inputs with pulses of constant amplitude and duration.

7. The combination according to claim 2, wherein each storage element of the shift register comprise parallel connected transistor flip-flop pairs one of which when "on" is indicative of storage of the information bit in its register, wherein each storage element has at least one pulse triggered input control gate, and wherein each of the end-most storage elements on opposite sides of said center storage element has its information but transistor so connected in circuit with its input control gate that such transistor when "on" remains "on" for successive triggerings of its input control gate.

8. The combination according to claim 7, wherein the information bit transistors of each pair of end-most and immediately adjacent storage elements are connected to the inputs of an OR logic circuit so that the latter provides a continuous output so long as the information bit is in either of such storage elements.

9. The combination according to claim 3, wherein said first and second counters have means to effect change in the predetermined numbers of input pulses to which they respond to provide said first and second output pulses thereby effecting corresponding changes in the amount of motor shaft phase deviation to which the shift register responds.

References Cited
UNITED STATES PATENTS

| | | | |
|---|---|---|---|
| 2,803,793 | 8/1957 | Wible | 318—314 |
| 3,110,853 | 11/1963 | Jones | 318—314 X |
| 3,206,665 | 9/1965 | Burlingham | 318—314 X |

ORIS L. RADER, *Primary Examiner.*

J. J. BAKER, *Assistant Examiner.*